(12) United States Patent
Senda et al.

(10) Patent No.: US 7,074,357 B2
(45) Date of Patent: Jul. 11, 2006

(54) GASKET

(75) Inventors: Kazuhisa Senda, Fujisawa (JP);
Osamu Ando, Yamato (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/620,880

(22) Filed: Jul. 16, 2003

(65) Prior Publication Data

US 2004/0012159 A1  Jan. 22, 2004

Related U.S. Application Data

(60) Division of application No. 09/911,066, filed on Jul. 23, 2001, now Pat. No. 6,814,359, which is a continuation-in-part of application No. PCT/JP00/02728, filed on Apr. 26, 2000.

(30) Foreign Application Priority Data

Apr. 27, 1999  (JP) ................. 11-119408

(51) Int. Cl.
B29C 45/14 (2006.01)

(52) U.S. Cl. .............. 264/259; 429/36; 524/730; 277/592; 277/654; 277/651; 277/650; 264/260; 264/271.1; 264/279.1

(58) Field of Classification Search ............ 264/259, 264/271.1, 279.1, 260; 277/654, 592, 628, 277/644, 649, 650, 651; 524/730; 429/36
See application file for complete search history.

(56) References Cited

U.S. PATENT DOCUMENTS

| | | | | |
|---|---|---|---|---|
| 4,227,701 A | * | 10/1980 | Tsuchida et al. ............ 429/56 |
| 4,337,332 A | * | 6/1982 | Melancon et al. ............ 528/15 |
| 5,179,148 A | * | 1/1993 | Inoue et al. ............... 524/265 |
| 5,240,765 A | * | 8/1993 | Takahashi et al. ............ 521/94 |
| 5,610,230 A | * | 3/1997 | Yoshida et al. ............. 524/730 |
| 5,671,927 A | | 9/1997 | Schweiger |
| 5,733,493 A | * | 3/1998 | Katsuno et al. ............ 264/255 |
| 5,989,704 A | | 11/1999 | Hashimoto et al. |
| 6,027,620 A | * | 2/2000 | Jackson et al. ............. 204/253 |
| 6,102,603 A | | 8/2000 | Yagi et al. |
| 6,145,847 A | | 11/2000 | Maeda et al. |
| 6,284,403 B1 | * | 9/2001 | Tsurutani et al. ............ 429/53 |
| 6,289,839 B1 | | 9/2001 | Misui et al. |
| 6,451,478 B1 | * | 9/2002 | Okahisa et al. ............ 429/162 |
| 6,610,437 B1 | * | 8/2003 | Tsurutani et al. ............ 429/56 |
| 6,720,103 B1 | * | 4/2004 | Nagai ........................... 429/36 |
| 2001/0048202 A1 | | 12/2001 | Zerfab et al. |
| 2003/0130363 A1 | * | 7/2003 | Meguriya ..................... 521/54 |

FOREIGN PATENT DOCUMENTS

| | | | |
|---|---|---|---|
| JP | 63308864 | | 12/1988 |
| JP | 4-211934 | | 8/1992 |
| JP | 406271684 | * | 9/1994 |
| JP | 8-148391 | * | 6/1996 |
| JP | 8-174604 | | 7/1996 |
| JP | 10-95071 | * | 4/1998 |
| JP | 1095071 | | 4/1998 |
| JP | 1220345 | * | 7/2002 |

* cited by examiner

*Primary Examiner*—Katherine Mitchell
(74) *Attorney, Agent, or Firm*—Butzel Long

(57) ABSTRACT

A film-integrated gasket comprising a resin film and an adhesive rubber layer directly molded on the resin film. The adhesive rubber layer is molded from addition reaction type silicone rubber. The adhesive rubber layer can have a reduced thickness and can prevent positional alignment failure, making it suitable for a thin seal that can be used in a fuel cell, a secondary battery, a condenser, etc. without contamination of electrolytic solution, catalyst, etc. used in the cells.

9 Claims, 1 Drawing Sheet

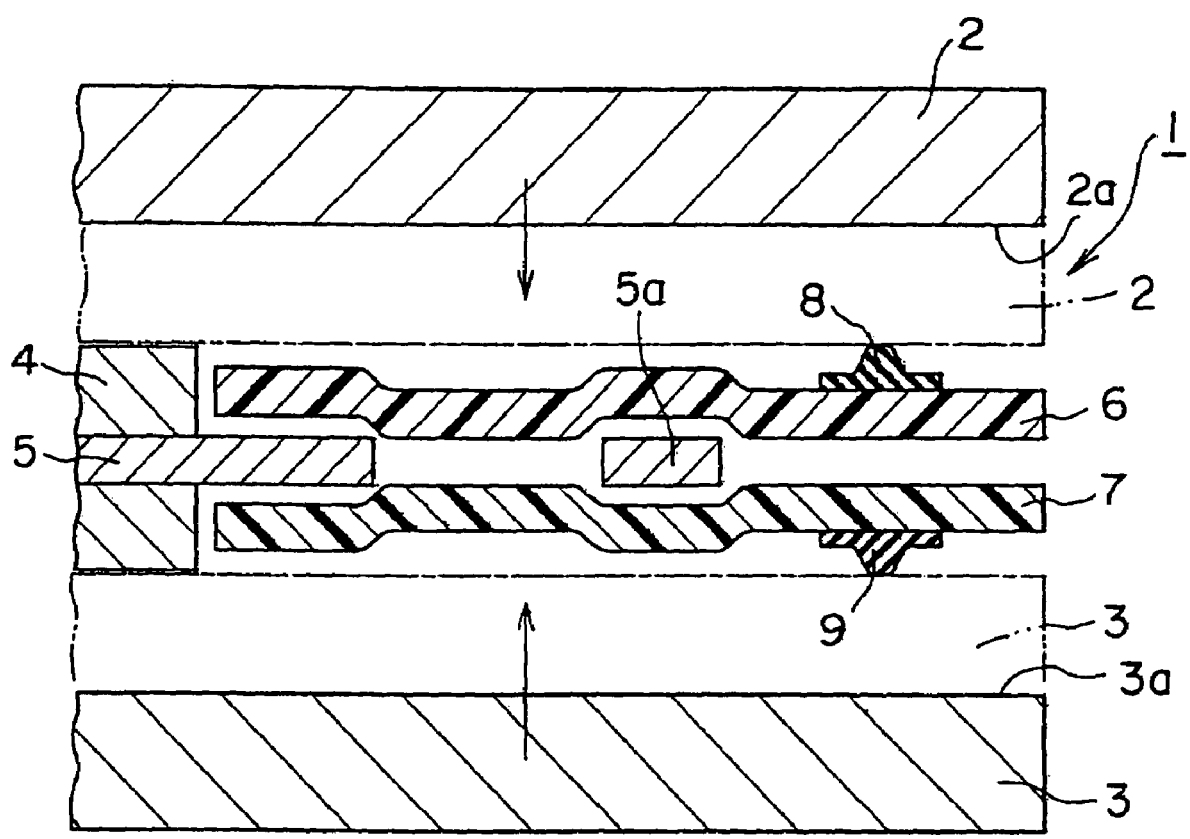

GASKET

RELATED APPLICATION

This application is a Divisional of U.S. patent application Ser. No. 09/911,066, filed on Jul. 23, 2001 now U.S. Pat. No. 6,814,359 which is a Continuation-In-Part of PCT Application No. PCT/JP00/02728, filed Apr. 26, 2000.

TECHNICAL FIELD

The present invention relates to a gasket, and more particularly to a gasket for use as a thin seal in fuel cells, secondary batteries, condensers, etc.

BACKGROUND ART

For gaskets used in fuel cells, secondary batteries, condensers, etc., rubber materials are widely used. Seal materials for these applications are much used for stacking a large number of cells one upon another, and the stacked products themselves, e.g. fuel cells, secondary batteries, condensers, etc. can be reduced in size by use of seal, materials as thin as or as narrow as possible.

As to thin seals for these applications, a gasket (JP-A-9-231987, JP-A-7-263004, JP-A-7-226220, JP-A-7-153480, etc.) and a gasket comprising a rubber sheet and a foamed sponge layer disposed thereon (JP-A-312223) have been proposed, but all of these thin seals are not directed to satisfying such requirements as reduction in thickness of seals, prevention of positional alignment failure during the assembling, reduction in specific pressure, specific pressure uniformalization, etc., and are hard to satisfy, if any, all these requirements.

That is, the ordinary separated type gaskets can satisfy only the reduction in specific pressure, specific pressure uniformalization, etc. but fails to satisfy reduction in thickness of seals, positional alignment failure during the assembling, etc. at the same time.

When the rubber hardness is high in case of stacking a large number of unit cells one upon another, tightening force of seal is liable to become uneven locally or depending on stacking positions, and thus a low rubber hardness is required for the rubber seal materials.

When the rubber seal materials are thin or narrow, or low in hardness, the seal materials themselves become so limp and soft, that it is difficult to mount the seals on the seal positions exactly and rapidly during the cell assembling and liable to cause a sealing failure in the stacked products.

To improve handling of seal materials, a somewhat hard and thin substrate, e.g. a stainless steel sheet (SUS grade), whose one side or both sides are integrally molded with a thin or narrow low-hardness rubber seal, is used, and such a substrate-integrated seal never undergoes considerable sagging when its one end is picked up and thus can be mounted on the desired position exactly, thereby facilitating the cell assembling work.

However, such integration of the substrate with rubber requires an additional adhesive to bond the substrate to the rubber, and thus an additional coating step and a drying step of the adhesive are required, resulting in a cost increase. Furthermore, components of the adhesive are partially extracted into the electrolytic solution, etc. with a risk of contamination of the electrolytic solution or catalysts.

Furthermore, from the viewpoints of performance or life of cells (including fuel cells and secondary batteries), condensers, etc., materials incapable of contaminating liquids to be used in the cells, etc. such as electrolytic solution, etc. or catalyst for promoting the reaction, etc. (e.g. a catalyst layer of platinum, etc. present on both sides of an electrolyte membrane or in the electrolyte membrane) are required as the materials for use in the cells or condensers.

Less harmful extractable components and no contamination are required for seal materials for use in the cells or condensers, so that the seal material components may not give no adverse effect at all on the cells or condensers, particularly in case of fuel cells, contamination, if any, of catalyst (Pt) with extracted components from cell member can decrease power generation performance, leading to risks such as a failure of stable power supply.

Furthermore, in case of fuel cells, the electrode plates, solid electrolyte membranes, separating plates, etc. are fastened by compression, and thus a smaller reaction force is require, during the fastening. In the fuel cells, it is necessary that the electrolyte membrane must be always wet and thus extractable components from the seal material into water supplied to keep the wet state or into water formed by reaction of hydrogen with oxygen (the electrolytic solution) must be less.

DISCLOSURE OF THE INVENTION

An object of the present invention is to provide an integrated gasket of a substrate (or a carrier member) and a rubber layer (or an elestomeric polymer member), which can be used as a thin seal capable of satisfying reduction in specific pressure and specific pressure uniformalization and also reduction in thickness of seal materials, positional alignment failure during the assembling, etc. at the same time, and also incapable of contaminating the electrolytic solution, catalyst, etc. in the cells or condensers, when set therein.

The object of the present invention can be attained by a film-integrated gasket, which comprises a resin film (or a carrier member) and rubber layer (or an elastomeric polymer member) having an adhesiveness to the resin film (adhesive rubber) by molding.

Another object of the present invention is to provide a static gasket having no contaminants contaminating the fluid to be sealed.

The object of the present invention can be can be attained by a static gasket for sealing fluids, comprising a carrier member (or a substrate) and an elastomeric polymer member (or a rubber layer) having an adhesive component which bonds to said carrier member and prevents contamination of the fluids to be sealed. Namely, the elastomeric polymer member has an adhesive component in itself which has a property to bond to the carrier member and has substantially no contaminants contaminating the sealing fluids to be sealed. Between the carrier member and the elastomeric polymer member there is no additional adhesives which could cause contamination of the sealing fluids to be sealed.

Still another object of the present invention is to provide a static gasket the deformation or compression of which is limited to a specific level when in use.

Said still another object of the present invention can be attained by a static gasket comprising a resin film or a carrier member, an elastomeric polymer member disposed on said carrier member and a compression limiter placed adjacent to the elastomeric polymer member for limiting the distance between fastening plates the gasket is placed therebetween.

According to the invention the distance between the fastening plates is limited so that the deformation or compression of the gasket can be limited or controlled arbitrarily by changing the thickness of the limiter.

Any resin film can be used as a substrate or a carrier member, so long as it can withstand the molding temperature of the adhesive rubber (about 100° C.~about 200° C.). For example, polyester film (typically polyethylene terephthalate), polyimide film, polyamideimide film, etc. can be used. From the viewpoint of heat resistance, polyimide film is preferable. From the viewpoint of producing a thin seal, the resin film must have a thickness of about 10~about 500 μm, preferably about 50~about 100 μm.

Any rubber or elastomeric polymer member having an adhesiveness toward the resin film can be used, so far as the rubber can form a rubber layer of low hardness (JIS A hardness: about 70 or less, preferably about 10~about 40). For example, silicone rubber, fluorosilicone rubber, fluoro rubber, nitrile rubber, EPDM, etc. each in a liquid or paste state can be used. The low hardness of the rubber can decrease the reaction force generated when the electrode plates, solid electrolyte membranes, separate plates, etc. are fastened together by compression in case of, e.g. fuel cells.

Among these adhesive rubbers, silicon rubber in a liquid or paste state, particularly addition reaction-curable type silicone rubber is preferable. Addition reaction-curable type silicone rubber comprises a composition comprising (a) 100 parts by weight of alkenyl group-containing organopolysiloxane and (b) such an amount of organohydrogenpolysiloxane having at least 2H atoms directly bonded to the Si atom in one molecule as to make 0.4–5.0 parts of the H atom (i.e., SiH group) to one part of the alkenyl group of the component (a), and practically, commercially available products, e.g. X-34-1277, X-34-1547, X-34-1427, X-34-1464, X-34-1535, X-34-1534, etc. (products made by Sbin-Etsu Chemical Co., Ltd. Japan) can be used as such.

The composition containing (a) and (b) components further contains a catalytic amount of Pt, etc. and (c) about 0.1–about 50 parts by weight of an adhesiveness-endowing component, thereby forming the addition reaction-curable type silicone rubber. Furthermore, not more than about 50 parts by weight of fine silica powder having a specific surface area of not less than about 50 m²/g may be added thereto.

Alkenyl group-containing organopolysiloxane as component (a) and organohydrogenpolysiloxane as component (b) undergo cross-linking reaction in the presence of a Pt catalyst by adding hydrogen atoms to the alkenyl groups as follows:

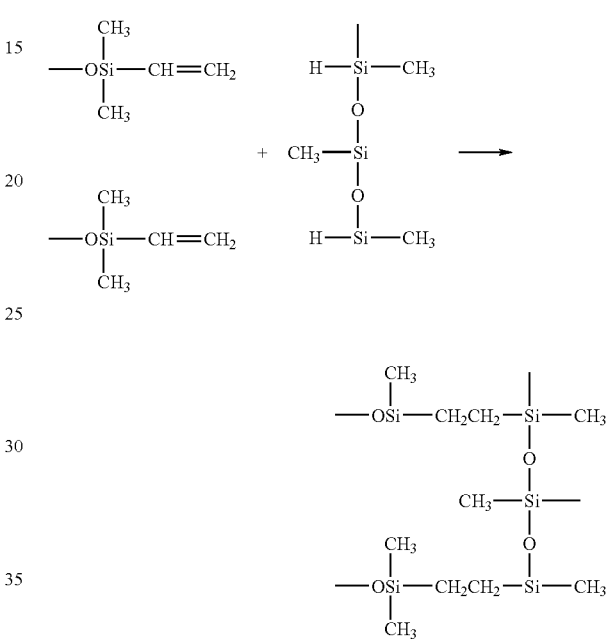

Adhesiveness-endowing agent to be added to the foregoing components (a) and (b) as component (c) includes, for example, organosilicone compounds having at least one H atom directly bonded to the Si atom (SiH group) in one molecule, as given below:

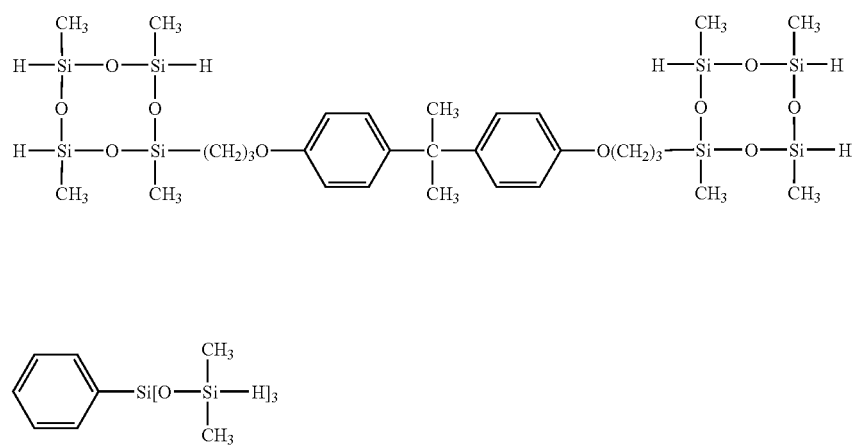

Integration of the resin film with the addition reaction-curable type silicone rubber layer (silicone rubber in a liquid or paste state) comprising the foregoing components by molding can be carried out by a procedure of placing uncured liquid or paste silicone rubber in a desired pattern onto a premolded resin film, followed by heating below the softening point of the film-constituting resin (mold process, coating process, dipping process, etc.), a procedure of placing uncured liquid or paste silicone rubber onto a premolded resin film, followed by compression with heating below the softening point of the film-constituting resin, a procedure of premolding a film in a mold by a molding machine and injecting liquid or paste silicone rubber under a low injection pressure into the mold, followed by heating at the molding temperature of the silicone rubber, etc..

Rubber layer or an elastomeric polymer member, which is characterized as a self-bonding elastomer member having a property to bond to the resin film directly, is molded on one side or both sides of the resin film or a carrier member to thickness of about 0.1~about 10 mm, preferably about 0.5~about 2 mm on one side of the resin film. It is particularly preferable to mold the rubber layer in an inverted T-type stepped wall cross-section with a layer bottom width of about 0.5~about 5 mm, preferably about 1~about 2 mm (as shown by reference numerals 8 and 9 in FIG. 1), because the reaction force is lowered when the fuel cell members are fastened by compression.

BRIEF DESCRIPTION OF THE DRAWING

FIG. 1 is a vertical cross-sectional view showing dismantled members of unit cell before assembling as an application example of the present gasket to a fuel cell.

That is, an application example of the present gasket in a fuel cell is shown in FIG. 1, i.e., vertical cross-sectional view of dismantled members of unit cell before assembling, where the gasket is an integrated gasket of resin film-cured rubber layer in an inverted T-type stepped wall cross-section, indicated by reference numerals 6 and 8 or 7 and 9, respectively. Unit cell 1 as a minimum unit for a fuel cell that is assembled by stacking several tens to several hundred of unit cells one upon another comprises a pair of counterposed separators (current collectors) 2 and 3, each formed in a flat rectangular shape, composed of porous carbon, and a membrane-electrode assembly (MEA) 4 comprising a polymeric electrolyte membrane, a catalyst layer, a reaction electrode, etc., each likewise formed in a flat rectangular shape, disposed between separators 2 and 3.

MEA is supported by a holder sheet 5, formed likewise in a flat rectangular shape, flanged out to a sufficient extend outwards from the outer edges of MEA 4. Holder sheet 5 and narrow spacer sheet 5a of predetermined size are vertically sandwiched between a pair of counterposed resin films 6 and 7 of punched-out flat rectangular shape. That is MEA 4 is vertically supported in a pressed-down state by a pair of resin films 6 and 7 through holder sheet 5 and spacer sheet 5a.

The thickness and the width in cross-section of the spacer sheet and the holder sheet can be respectively varied arbitrarily.

Spacer sheet 5a also works as a compression limiter of the elastomeric polymer member or cured rubber layers 8 and 9 when a pair of counterposed separators 2 and 3 are fastened at stacking the cells. The distance between separators 2 and 3 can be limited by both the thickness of spacer sheet 5a and resin films 6, 7 when the separators are fastened at stacking the cells, so that the deformation ratio or compression of rubber layers 8 and 9 can be controlled or limited in a desired range of deformation.

Resin films 6 and 7 are integrated with cured rubber layers 8 and 9 in an inverted T-type stepped wall cross-section molded from a liquid or paste silicone rubber, respectively, on the outer surfaces at the outer peripheral parts of the resin films. Drying of the electrolyte membrane in MEA 4 by evaporation of water can be prevented through tight sealing with cured rubber layers 8 and 9 against inside surfaces 2a and 3a of separators 2 and 3, respectively, thereby obtaining the required sealability.

In the fuel cell comprising unit cells in the foregoing structure of this embodiment, the following effects can be obtained. MEA 4 is indirectly supported by a pair of resin films 6 and 7 pressed together through holder 5 and spacer sheet 5a. Thus, in the assembling of each unit cell 1, MEA 4 can be easily and exactly aligned under a constant specific pressure, thereby remarkably improving the working efficiency and handling during the unit cell assembling. Furthermore, the desired sealability can be stably maintained even if the durability of the fuel cell is a long time, thereby preventing drying of the electrolyte membrane by evaporation of water and assuring a stable power generation efficiency.

BEST MODES FOR CARRYING OUT THE INVENTION

The present invention will be described below, referring to Examples.

EXAMPLE 1

Liquid silicone rubber for LIMS (liquid injection molding) comprising equal amounts of X-34-1277 A and X-34-1277 B (made by Shin-Etsu Chemical Co., Ltd.) as alkenyl group-containing organohydrogenpolysiloxane-organopolysiloxane, containing a platinum catalyst and an adhesiveness-endowing agent was injected into a mold of a liquid silicone molding machine, where polyethylene terephthalate (100 μm thick) was set in the mold in advance without using any other adhesives, and molded at a mold temperature of 140° C. for a molding time of 150 seconds to obtain a film-integrated gasket with a silicone rubber layer in an inverted T-type stepped wall cross-section (layer bottom width: 2.4 mm and layer height at the central 1.2 mm-wide region: 1.0 mm), formed on one side or both sides of the resin film.

Adhesiveness between the resin film and the silicone rubber layer of the resulting film integrated gasket was determined by a peeling test according to JIS K-6256, and it was found that the gasket itself was ruptured, showing a good adhesiveness.

The film-integrated gasket in a square ring form 100 mm long and 100 mm wide, with the same silicone rubber layer as above, obtained by molding at 140° C. for 150 seconds and a stainless steel sheet (SUS grade, surface roughness Ra=0.2) as a counter part material were fastened together under a specific pressure (fastening pressure: 1N or less) with a fastening degree of 50%, and air pressure (0.2 MPa) was applied thereto. Air leakage was found to be 10 cc/min. or less.

Furthermore, a test piece of silicone rubber layer alone (sheet having 2 mm thick formed from the same materials above by a mold temperature of 140° for a molding time of 150 seconds, followed by secondary vulcanization at 200°

C. for 4 hours) was tested according to JIS K-6251 and JIS K-6253 to determine its physical properties. The following results were obtained:

Hardness (JIS A): 40
Tensile strength: 9 MPa
Elongation: 600%
Specific gravity: 1.1

Furthermore, JIS small block (prepared by molding at 140° C. for 150 seconds, followed by secondary vulcanization at 200° C. for 4 hours in the same manner as above) was heated at 120° C. for predetermined time and then compression set is determined.

| Heating time at 120° C. (hours) | Compression set |
|---|---|
| 22 | 9% |
| 70 | 16% |
| 200 | 26% |
| 500 | 38% |
| 1,000 | 51% |

EXAMPLE 2

In Example 1, polyimide film having the same thickness was used in place of the polyethylene terephthalate film. Adhesiveness of the resulting film-integrated gasket was determined by the same peeling test as in Example 1 and it was found that the gasket itself was ruptured, showing a good adhesiveness.

EXAMPLE 3

A film-integrated gasket in a square ring form (99 mm long and 99 mm wide) was formed from the same liquid silicone rubber for LIMS as used in Example 1 on a polyimide film (about 100 mm long, about 100 mm wide and 100 μm thick) as a silicone rubber layer in an inverted T-type stepped wall cross-section (layer bottom width: 3 mm and layer height at the central 1.5 mm wide region: 1.0 mm), thereby obtaining a film-integrated gasket.

The resulting film-integrated gasket was dried in vacuum at 200° C. for 72 hours, and then cut into pieces, 10 mm long and 10 mm wide, so that it could be placed in a vessel of 200 ml capacity and dipped into propylene carbonate containing 200 ml of support electrolyte [$(C_2H_5)_4NClO_4$] for one week. A three-electrode cell was set up, using this non-aqueous electrolyte solution in an argon atmosphere and subjected to cyclic voltametry in an electrochemical tester, made by Solarton (working electrode: glassy carbon, 1 mm in diameter; reference electrode: Ag/AgCl; and counter electrode: platinum wire) at room temperature and a scanning speed of 1 mV/sec. By comparing the values thus obtained with values of standard electrolytic solution, state of oxidation-reduction reaction was investigated. No clear differentiation was found.

INDUSTRIAL UTILITY

The present film-integrated gasket can satisfy required reduction in thickness for a thin seal, prevention of positional alignment failure, etc. and also can attain reduction in specific pressure, specific pressure uniformalization, etc. to equivalent degrees to those so far attained. The present invention can be also used as a gasket of a small groove depth. The present film-integrated gasket is prepared by directly disposing liquid rubber on the resin film without using any adhesive, and thus no adhesive-extracted components are involved at all, resulting in much less contamination of service environments by the liquid rubber. Furthermore, there is little air leakage at a rubber layer height of 1 mm and an air pressure of 0.2 MPa, and thus the present gasket can be suitably used for fuel cells, secondary batteries, condensers, etc. For example, in case of a fuel cell, the present gasket can be effectively used on electrodes, gas separator flow passage, etc.

The invention claimed is:

1. A process for producing a film-integrated gasket for sealing fluids of a fuel cell, said process comprising the steps of:
   a) providing a mold;
   b) providing a resin film in the mold; and
   c) molding a rubber layer on said resin film to produce a film-integrated gasket, said rubber layer comprising an addition reaction type silicone rubber and having an adhesive component which bonds to said resin film and prevents contamination of fluid being sealed, the addition reaction type silicone rubber comprising: (A) 100 parts by weight of an alkenyl group-containing organopolysiloxane and (B) such an amount of organohydrogenpolysiloxane having at least 2 H atoms directly bonded to a Si atom in one molecule as to make 0.4–5.0 parts of the H atom to one part of the alkenyl group of component (A), and the adhesive component comprising: (C) an organosilicone compound having at least one H atom directly bonded to a Si atom.

2. A process for producing a film-integrated gasket according to claim 1, wherein the resin film has a thickness of about 10 to about 500 μm.

3. A process for producing a film-integrated gasket according to claim 1, wherein the rubber layer having an adhesiveness to the resin film is a rubber layer molded from liquid or paste rubber.

4. A process for producing a film-integrated gasket according to claim 3, wherein the liquid or paste rubber is silicone rubber.

5. A process for producing a film-integrated gasket according to claim 4, wherein the silicone rubber is an addition reaction type silicone rubber.

6. A process for producing a film-integrated gasket according to claim 3, wherein the rubber layer is a rubber layer having a JIS A hardness of 70 or less.

7. A process for producing a film-integrated gasket according to claim 3, wherein the rubber layer is a rubber layer having a JIS A hardness of about 10 to about 40.

8. A process for producing a film-integrated gasket according to claim 1, wherein the gasket is used as a thin sealing element.

9. A process for producing a film-integrated gasket according to claim 8 for use in a fuel cell, a secondary battery or a condenser.

* * * * *

UNITED STATES PATENT AND TRADEMARK OFFICE
CERTIFICATE OF CORRECTION

| | | |
|---|---|---|
| PATENT NO. | : 7,074,357 B2 | Page 1 of 1 |
| APPLICATION NO. | : 10/620880 | |
| DATED | : July 11, 2006 | |
| INVENTOR(S) | : Kazuhisa Senda and Osamu Ando | |

It is certified that error appears in the above-identified patent and that said Letters Patent is hereby corrected as shown below:

Disclosure of the Invention

Column 3,
    Line 32, should be changed from
        "loxane having at least 2II atoms directly bonded to the Si"
to
        --loxane having at least 2 H atoms directly bonded to the Si--

Signed and Sealed this

Twenty-third Day of October, 2007

JON W. DUDAS
*Director of the United States Patent and Trademark Office*